G. JONES.
WEIGHING APPARATUS.
APPLICATION FILED JUNE 17, 1911.
1,046,797.
Patented Dec. 10, 1912.
2 SHEETS—SHEET 1.
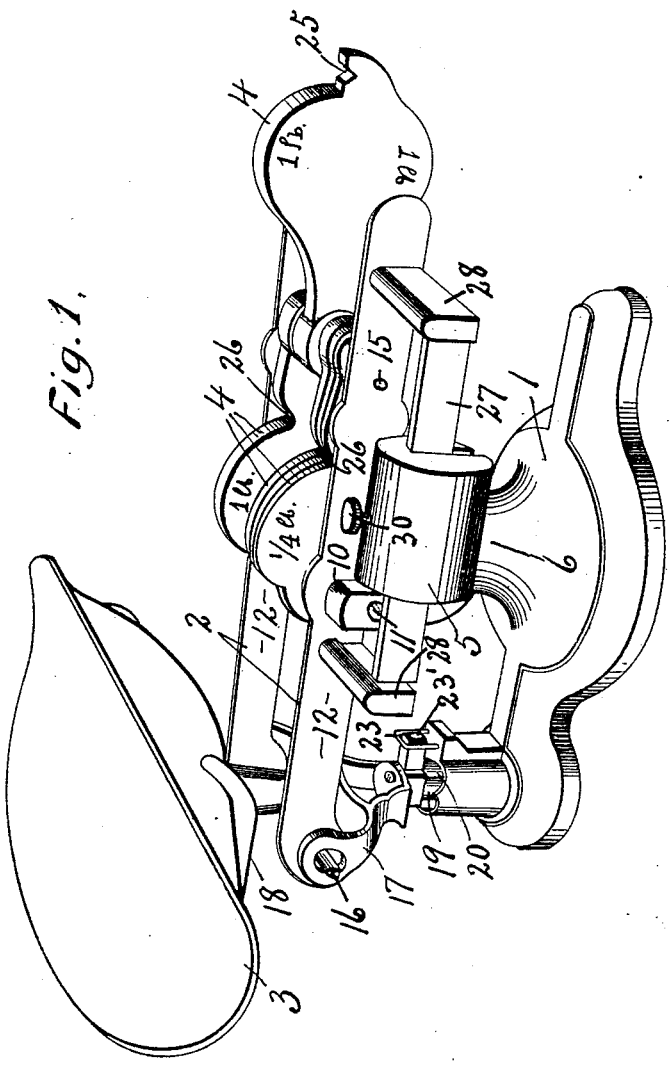
Witnesses
Chas. E. Skelton.
H. E. Chase
Inventor
Gerry Jones
By Howard P. Denison
Atty.

G. JONES.
WEIGHING APPARATUS.
APPLICATION FILED JUNE 17, 1911.
1,046,797.
Patented Dec. 10, 1912.
2 SHEETS—SHEET 2.
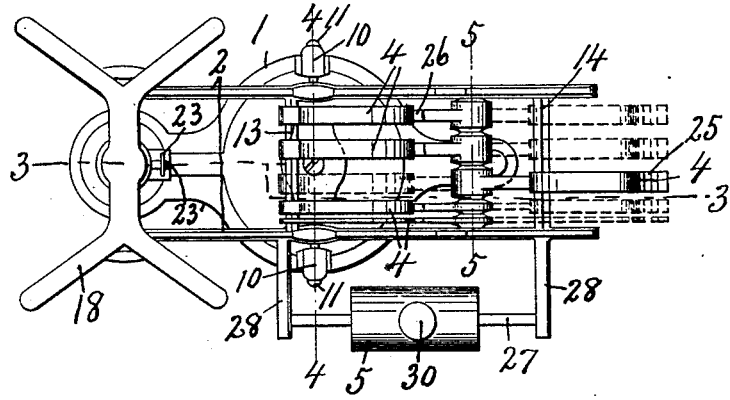
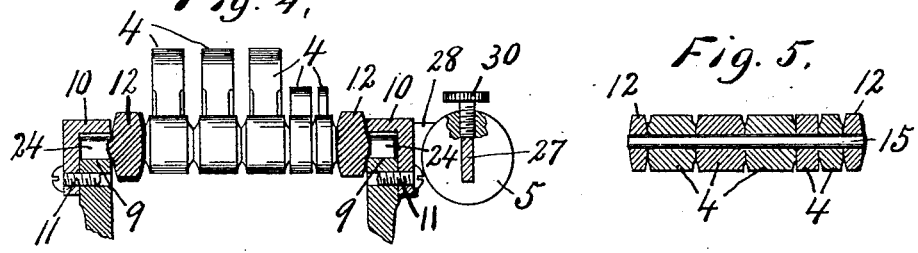
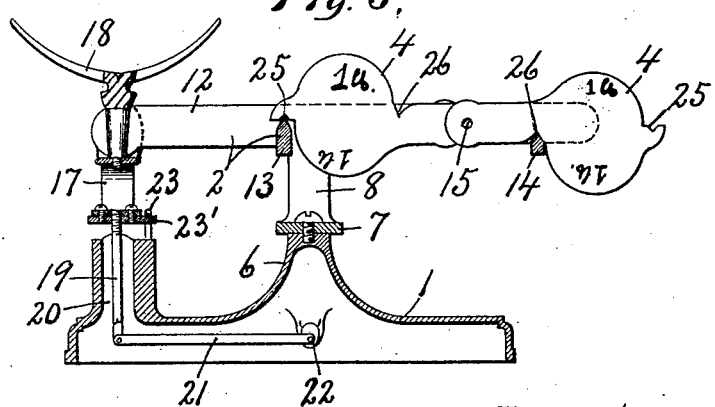
Witnesses.
Chas E Skelton.
H. E. Chase
Inventor.
Gerry Jones
By Howard P. Denison
Att'y.

UNITED STATES PATENT OFFICE.

GERRY JONES, OF BINGHAMTON, NEW YORK.

WEIGHING APPARATUS.

1,046,797.   Specification of Letters Patent.   Patented Dec. 10, 1912.

Application filed June 17, 1911. Serial No. 633,716.

*To all whom it may concern:*

Be it known that I, GERRY JONES, of Binghamton, in the county of Broome, in the State of New York, have invented new and useful Improvements in Weighing Apparatus, of which the following, taken in connection with the accompanying drawings, is a full, clear, and exact description.

This invention relates to certain improvements in weighing apparatus and while it is particularly useful in connection with what is commonly known as counter scales, it may be applied to other forms of weighing devices in which sliding or attachable weights are used to counterbalance or determine the weight of various commodities or pressures. In this class of apparatus, it is customary to employ either a sliding weight movable along a graduated weighing beam or lever or to provide a series of weights of different denominations which are removably placed upon a suitable platform or other support on the weighing beam or lever, and aside from the inconvenience arising from the liability of loosening or misplacing some of the removable weights, there is always more or less wear to the commodity-supporting tray, platform or scoop and other parts of the weighing apparatus which renders the weighing more or less inaccurate and inasmuch as accuracy is one of the essential requirements of this class of instruments, I have sought to provide a simple, practical and efficient means for not only obviating the liability of loss or misplacement of the weights but also to provide means to compensate for any inaccuracy in the normal balance of the weighing mechanism and at the same time to enable such mechanism to be easily and quickly inspected and readjusted for accurate weighing.

In other words one of the main objects of the invention is to provide a weighing beam or lever with a plurality of pivoted weights of different denominations normally positioned to effect an accurate balance of the weighing beam or lever and capable of being shifted one or more at a time to a different position to accurately counterbalance the commodity which may be placed upon the receiving tray, thereby indicating the exact weight of such commodity.

A still further object is to provide the weighing beam or lever with an adjustable balancing member slidable thereon for the purpose of accurately establishing a normal balance of such beam or lever to compensate for any inequality of normal balance which may occur from wear or any other cause.

Other objects and uses relating to specific parts of the device will be brought out in the following description:

In the drawings—Figure 1 is a perspective view of a store scales embodying the various features of my invention. Fig. 2 is a top plan of the same scales omitting the scoop or receptacle for the commodity to be weighed. Fig. 3 is a longitudinal vertical sectional view of the scales taken on line 3—3, Fig. 2. Figs. 4 and 5 are enlarged detail sectional views taken respectively on lines 4—4 and 5—5, Fig. 2.

As illustrated in the drawings, this weighing apparatus comprises a suitable support —1—, a weighing beam —2—, a commodity support —3— operatively connected to one end of the weighing beam, a plurality of weighted levers —4— pivoted to the opposite end of the beam, and a balancing member —5— adjustable lengthwise of and upon the beam for balancing the latter when the weighted members —4— are in their normal positions of rest.

The apparatus shown is designed for store use and is what is commonly known as a counter scales in which the base —1— is provided with an upwardly projecting boss or standard —6— upon which is mounted a bracket —7— having upwardly projecting arms —8— spaced some distance apart transversely and formed with open-sided V-shape bearings —9—, the open sides of which are covered by removable caps —10— held in place by suitable fastening means as screws —11—, Fig. 4.

The weighing beam —2— preferably comprises opposite parallel bars —12— spaced some distance apart and connected by cross bars —13— and —14— and a pivotal bolt —15—, the latter serving as a convenient support for the weighted levers —4—. The commodity supporting end of the weighing beam —2— is provided with knife bearings —16— projecting outwardly and laterally from the adjacent ends of the arms —12— for receiving a supporting pendant stirrup —17— upon which is centrally mounted a tray-receiving frame —18— for receiving the tray —3— in which the commodity to be weighed is placed. The stirrup —17— is provided with a central pendant guide rod —19— extending downwardly into a guide opening —20— in the base —1— and pivotally connected by a link —21— to a fixed support —22— centrally in said base for the purpose of guiding the stirrup in its vertical movement and at the same time allowing it to play freely without friction with the base.

A limiting stop consisting, in this instance, of a staple —23— is secured to a portion of the base —1— and overhangs a lug —23'— on the stirrup —17— to limit the upward rocking movement of the corresponding end of the weighing beam and parts carried thereby and at the same time leaving sufficient clearance for the free action of the weighing beam when balanced.

The weighing beam is fulcrumed intermediate its ends upon the upper ends of the arms —8— and for this purpose it is provided with knife bearings or trunnions —24— projecting laterally and outwardly from the side bars —12— and resting in the V-shape bearings —9— of the bracket —7—, thereby forming a convenient support upon which the weighing beam may be balanced or oscillated freely without liability of excessive friction or retardation.

The cross bars —13— and —14— are located at opposite sides of the axis of movement of the weighing beam or rather at opposite sides of the trunnions —24—, the cross bar —13— being located between said trunnions and knife bearings —16— for the stirrup —17— but preferably in close proximity to the trunnions —24— and forms a convenient rest for the weighted levers —4— when in their normal positions. The cross bar —14— is located a considerable distance to the opposite side of the trunnions —24— and preferably beyond the pivotal pin —15— for the weighted levers —4— and serves as a limiting stop or rest for said weighted levers when in their weighing positions as clearly shown in Figs. 2 and 3. Both of these cross bars —13— and —14— and also the pivotal pin or rod —15— are arranged parallel with each other and with the axis of the trunnions —24—, the cross bars —13— and —14— being provided with upper knife edges for engagement with V-shaped bearings —25— and —26— on the weighted levers —4— as best seen in Fig. 3. The object of this parallel arrangement and knife-edge bearings is to assure the engagement of the weighted levers with the weighing beam at exact predetermined distances from the axis of movement of the weighing beam so that when the weights are properly gaged to predetermined denominations, they will be self-centering upon their respective rests or cross bars —13— and —14— in either their normal or weighing positions.

The pivotal bolt —15— upon which the weighted levers —4— are mounted for swinging movement is located between the cross bars —13— and —14— but somewhat nearer the cross bar —14— so as to throw as much of their weight as possible upon the corresponding end of the weighing beam, the entire arrangement being such as to permit the use of levers of approximately the same weight as the denominations which they represent when in their weighing positions and also to establish a balance of the weighing beam when in their normal positions. For example, I have shown a series of weights pivoted coaxially and having their bearing points —25— the same distance from their pivotal axis while the pivotal points —26— are also the same distance from the axis, one of the weights representing a quarter of a pound, another a half pound and the others one pound each, all of which when in their normal positions exactly balance the weighing beam with the tray —3— thereon but without any commodity therein but when thrown to their weighing positions will exactly counterbalance a weight of any commodity corresponding to that designated on that particular weight or weights.

In order to compensate for any variation in the normal balance of the weighing beam due to wear or other cause, I have provided one side of the beam with a lengthwise guide bar —27— supported on suitable brackets —28— projecting laterally from one side of the beam but at opposite sides of its axis of movement and upon this guide bar is mounted the sliding weight —5— which may be adjusted lengthwise of the beam until the normal balance is established and may be held in its adjusted position by any suitable means as a set screw —30— shown in Figs. 1, 2 and 4.

In adjusting the weighing apparatus for use, the weights are first thrown to their normal positions so as to rest upon the bar —13— and if the beam is not exactly balanced under these conditions, the balancing weight —5— may be adjusted until such balance is established, whereupon the device is ready for use in weighing any commodity which may be placed in or upon the tray —3—. In order to ascertain the weight of such commodity, the weighted lever or levers —4— are thrown to their weighing positions so as to rest upon the cross bar —14— until sufficient weight is produced to exactly counterbalance the commodity, whereupon the weight denomination or denominations upon the weighted levers which are thus adjusted may be read or added to ascertain the correct weight of said commodity or on the other hand if a predetermined weight of such commodity is desired, as, for example, two pounds and three-quarters it will be simply necessary to throw two of the one-pound weights, the half-pound weight and a quarter-pound weight to their weighing positions and then to add to or subtract from the commodity until the beam is exactly balanced, thus indicating that the weight of the commodity is two and three-quarter pounds. In like manner any commodity may be weighed by this machine up to three and three-quarter pounds but it is evident that any number of weights may be used and that other weights of greater or less denominations may be substituted for those herein shown without departing from the spirit of my invention. It is also evident that although I have shown these pivoted levers and balance adjusting means as associated with an ordinary counter scales, the same or similar mechanism may be used in connection with any other scales in which a weighing beam is employed and therefore I do not limit myself to the precise construction and arrangement of the parts as herein set forth.

What I claim is:

1. In a weighing apparatus, a support, a weighing beam comprising separate bars fulcrumed intermediate their ends on said support, rigid connections between said bars, a commodity support pivotally mounted upon one end of the beam, and a plurality of weighted levers pivotally mounted upon said weighing beam and movable to opposite sides of their pivots.

2. In a weighing apparatus, a support, a weighing beam comprising separate bars fulcrumed intermediate their ends on said support, rigid connections between said bars, a commodity support pivotally mounted upon one end of the beam, and a plurality of weighted levers pivotally mounted upon the other end of the scale beam and movable to opposite sides of their pivots.

3. In a weighing apparatus, a support, a weighing beam comprising separate bars fulcrumed intermediate their ends on said support, rigid connections between said bars, a commodity support pivotally mounted upon one end of the beam, and a plurality of weighted levers pivotally mounted upon the other end of the scale beam and adapted to swing vertically to opposite sides of the pivots.

4. In a weighing apparatus, a support, a weighing beam comprising spaced separate bars fulcrumed intermediate their ends on said support, rigid connections between said bars on either side of said fulcrum, a commodity support upon one end thereof, and weights pivoted on said bars and adapted to rest on said rigid connections on either side of said fulcrum.

5. In a weighing apparatus, a support provided with two upwardly extending arms, a weighing beam fulcrumed on each arm, rigid connections between said weighing beams, weights pivoted upon one of said rigid connections and adapted to rest upon either side of the fulcrum of said beams.

In witness whereof I have hereunto set my hand on this 5th day of June 1911.

GERRY JONES.

Witnesses:
K. F. FLANNIGAN,
J. M. CADY.

---

Copies of this patent may be obtained for five cents each, by addressing the "Commissioner of Patents, Washington, D. C."